FIG. I.

INVENTOR
Charles A. Gilkison

INVENTOR
Charles A. Gilkison

United States Patent Office 3,366,886
Patented Jan. 30, 1968

3,366,886
LINEAR ACCELERATOR FREQUENCY CONTROL SYSTEM
Hugh L. Dryden, Deputy Administrator of the National Aeronautics and Space Administration, with respect to an invention of Charles A. Gilkison, Rolling Hills Estates, Calif.
Filed Oct. 24, 1965, Ser. No. 505,321
6 Claims. (Cl. 328—233)

ABSTRACT OF THE DISCLOSURE

A system for generating a signal wave having a frequency proportional to a measured physical phenomenon, particularly useful in controlling the frequency of an alternating voltage applied to a linear accelerator for charged particles, and including counting and control apparatus for applying a correction signal for varying the period of the generated signal wave in response to variations in a control signal representing the measured physical phenomenon.

---

Figure 1:
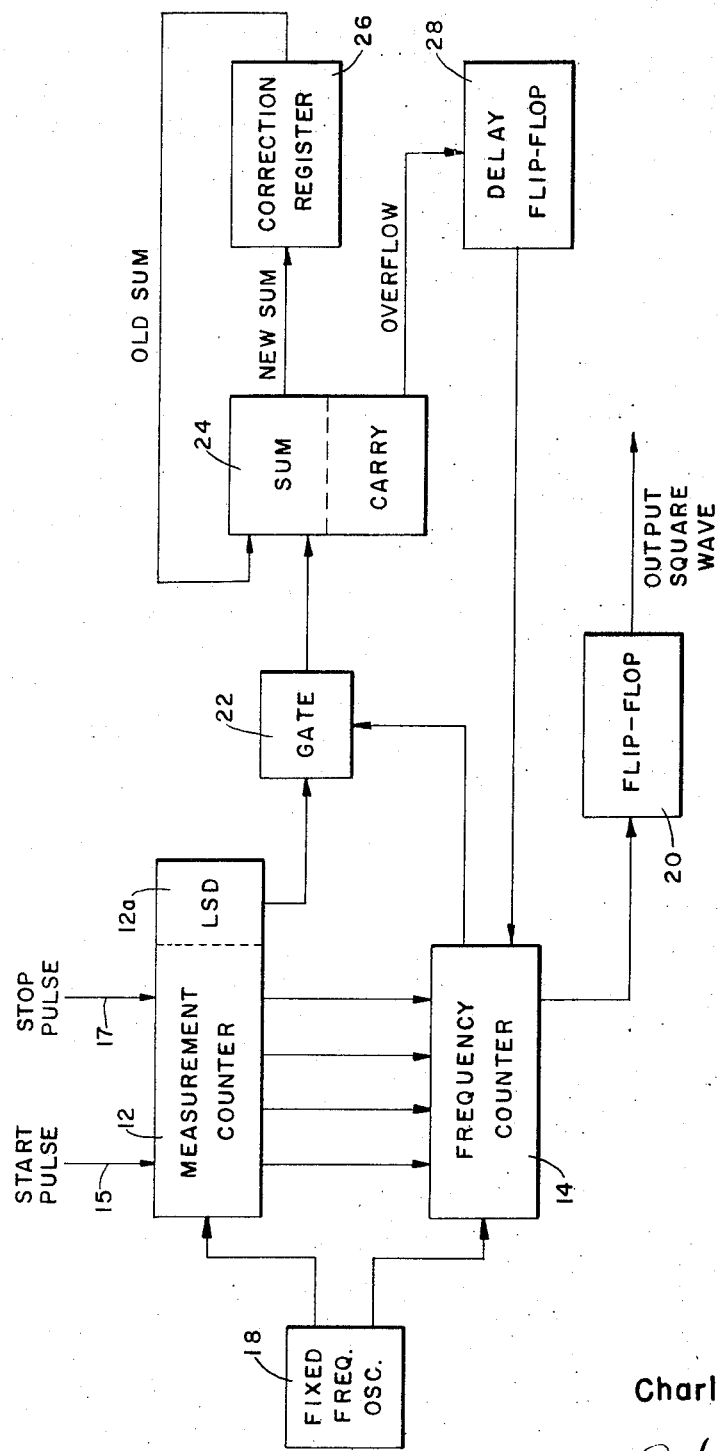

The invention described herein was made in the performance of work under a NASA contract and is subject to the provisions of Section 305 of the National Aeronautics and Space Act of 1958, Public Law 85–568 (72 Stat. 435, 42 U.S.C. 2457).

This invention relates generally to a frequency control system, and more particularly to a system for generating a signal wave having a frequency proportional to a measured physical phenomenon.

There are a number of instances where it is desirable that the frequency and phase of a periodic wave, such as a square wave, be precisely related to a control signal. The control signal itself may be a series of spaced pulses, a square wave or a periodic signal whose spacing, pulsewidth or repetition rate is indicative of the detected or measured physical phenomenon.

As a more specific example, the control signal may be spaced pulses derived from the drift tubes of a linear accelerator such that the spacing or time interval between pulses provides a measure of the initial velocity of a charged particle that is to be accelerated by an alternating electric field applied to the drift tubes of the accelerator. In this application, to insure successful acceleration of the particle there must be a proper phase reversal of the accelerating voltage producing the electric field as the particle travels, at extremely high speeds, through successive drift tubes, and this depends on the accuracy with which the frequency of the accelerating voltage can be controlled in relation to the initial velocity of the particle injected into the drift tubes. If the proper phase reversal fails to occur, the particle is subjected to a retarding rather than an accelerating voltage and is lost. Details of such a linear accelerator and the manner in which frequency control of the accelerating voltage in response to the particle initial velocity is utilized to successfully accelerate the particle is fully described in copending application, Ser. No. 505,076, filed Oct. 25, 1965, now Patent No. 3,317,846 and commonly assigned.

Digital frequency control systems are preferred for applications of the type mentioned above in that they offer higher accuracy, ease of implementation, and greater reliability than analog systems such as those utilizing more conventional voltage controlled oscillators. One such digital system utilizes a master fixed frequency oscillator to generate timing pulses, and a digital counter counts the timing pulses during the interval indicative of the measured quantity. In the specific application where the measured quantity is the initial velocity of a particle injected into the drift tubes of a linear accelerator, the digital counter starts counting the timing pulses from the master fixed frequency oscillator when the particle passes through a first measurement grid and stops when the particle passes through a second measurement grid, and this count is maintained until the particle has passed through the linear accelerator. The grids are spaced at a distance equal to the length of the first drift tube and the count accumulated by the digital counter represents a time equal to one half of the period of the accelerating voltage applied to the drift tubes.

At the end of the measurement interval the count accumulated in the measurement counter is transferred, in parallel, to a frequency counter which repetitively counts timing pulses from the fixed frequency oscillator, beginning with the count established by the measurement counter and ending at zero. Thus, the time required for the frequency counter to reach zero is equal to the interval initially measured (i.e., the desired half period of the accelerating voltage of the linear accelerator). Upon reaching zero, the frequency counter is automatically reset to the count still held in the measurement counter, and the countdown process of the frequency counter repeats. Each time the frequency counter reaches zero and resets it triggers a bistable device such as a flip-flop and a square wave is generated having a frequency related to the initial measurement interval.

The accuracy of a system of the described type is determined by the ratio of the frequency of the master fixed frequency oscillator to the desired frequency of the output square wave. For example, in the specific instance of a linear accelerator, in order to generate a 100 kc. accelerating voltage to an accuracy of 1 part in 100 (or 1%), a 10 mc. master timing signal is required. Thus the frequency response of the digital components used in the measurement and frequency counters provides limitations as to the accuracy which may be achieved, and result in practical restrictions on the velocity to which a particle may be successfully accelerated. Although a larger spacing between the measurement grids will allow a longer time to accumulate the initial count (count into the measurement counter) to allow greater accuracy with a given master timing frequency, the frequency counter which is fed by the measurement counter must ordinarily operate at the higher rate to provide the desired frequency for the accelerating voltage.

In accordance with present invention, the accuracy and response of the frequency control system of the above-described type may be increased by providing a greater measurement interval such that the count accumulated by the measurement counter is greater by one or more digits than that required to achieve the desired frequency of the output signal. The extra digits, the least significant digits, are transferred to a correction register. The most significant digits of the measurement counter, representing an interval equal to or slightly less than a half-period of desired frequency of the output signal, are transferred to the frequency counter. The frequency counter repetitively counts timing pulses, beginning with the count received in the measurement counter, and ending at zero. During each counting cycle the least significant digits of the measurement counter are transferred out, summed, and stored in the correction register. When this sum exceeds a predetermined amount an overflow pulse occurs which is utilized to delay the triggering of the bistable circuit generating the square wave for the period of a selected number of additional master timing pulse. Thus the half-period of the output signal is delayed whenever the accumulation of the least significant digits into the measurement counter exceeds a predetermined amount, with the result that correction is provided by periodically allowing the error to build up and then re-referencing the phase and frequency of the output signal before the error exceeds a tolerable level. This permits the frequency counter to operate at a lower frequency to provide the desired accuracy.

Figure 2:
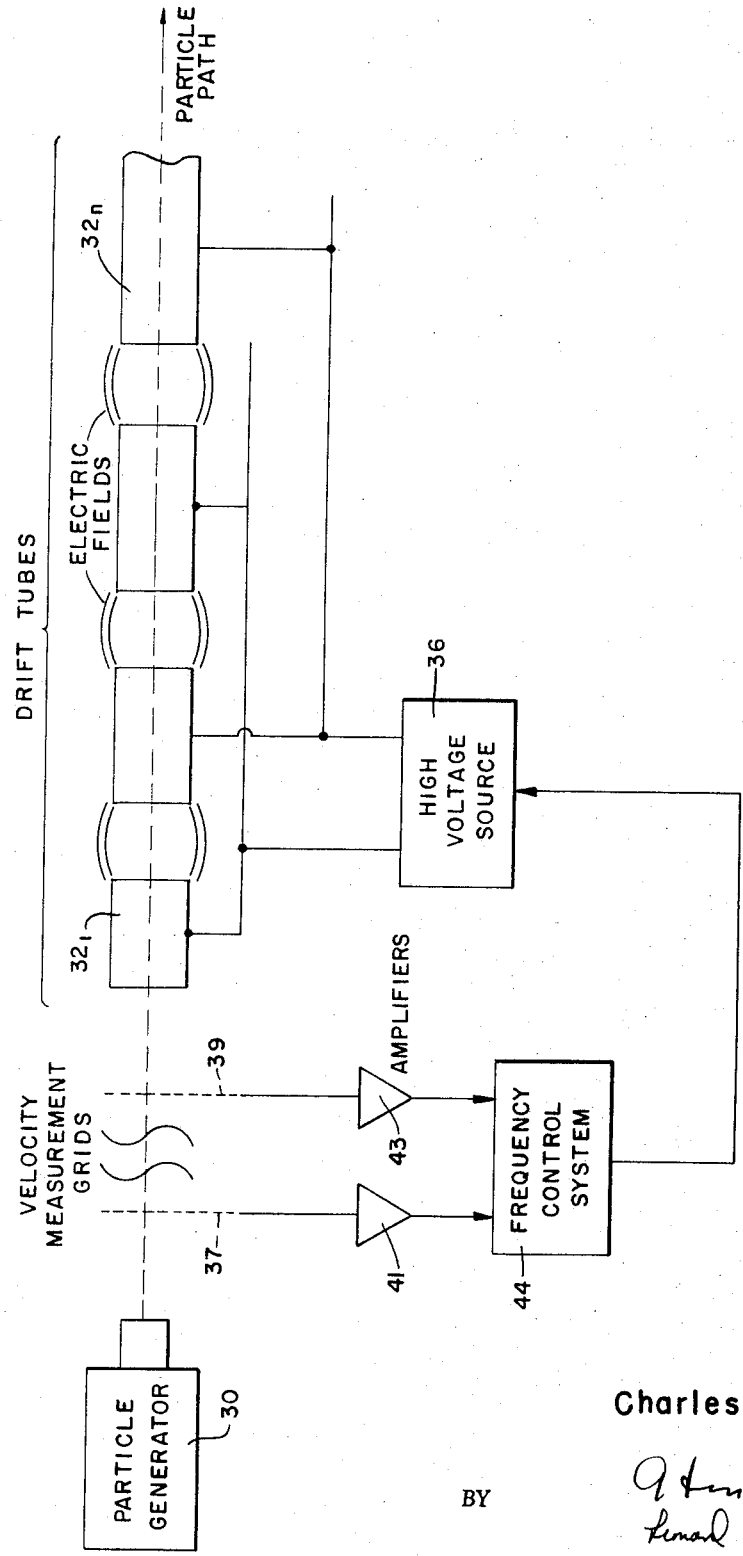

The various objects and features and attending advantages of the present invention will become apparent from the following drawings in which:

FIGURE 1 is a circuit diagram, in block form, of the frequency control system of the invention; and FIGURE 2 is a diagrammatic representation in which the frequency control system of the present invention is utilized to control the accelerating potential of a linear accelerator.

With reference now to FIGURE 1, the frequency control system of the present invention includes a measurement counter 12 and a frequency counter 14. Each of counters 12 and 14 are digital counters of the conventional type and may include, for example, a plurality of cascaded counter stages. For the reasons subsequently described the measurement counter 12 contains $n$ stages wherein the frequency counter 14 contains $n-x$ stages. For the purposes of understanding the invention set forth in the embodiment of FIGURE 1, a decimal numbering system is assumed and the maximum capacity of frequency counter 14 is selected to be one digit less than the maximum capacity of measurement counter 12. It is to be understood, however, that the underlined principles of the invention are equally applicable to other numbering systems, such as a binary system, and that the capacities of counters 12 and 14 may vary by more than one digit.

Measurement counter 12 receives a start pulse on line 15 and a stop pulse on line 17. The time interval between the start and stop pulses provides a control signal representative of a desired measurement interval, and as will be subsequently described may be related to the initial velocity of a particle injected into the drift tubes of a linear accelerator. In addition, both counters 12 and 14 receive master timing pulses from a fixed frequency oscillator 18. Measurement counter 12 counts the number of master timing pulses received from fixed frequency oscillator 18 during the measurement interval, and this count is retained until subsequent start and stop pulses establish a new measurement interval, at which time a new count is registered.

The output of all stages of measurement counter 12 except the final stage, designated as 12a and representing the least significant digit (LSD) of the accumulated count, is fed to like stages of frequency counter 14. Thus, all the stages of frequency counter 14 receive parallel inputs from the most significant digits accumulated by measurement counter 12. Frequency counter 14 then counts the master timing pulses produced by fixed frequency oscillator 18, beginning with the count received from measurement counter 12 and ending at zero. When frequency counter 13 reaches zero, it resets, again receiving in parallel the count of the most significant digits accumulated by measurement counter 12, and the count-down process repeats. Also, each time frequency counter 14 reaches zero it produces a pulse operable to trigger flip-flop 20. The output of flip-flop 20 is square wave having a half-period determined by cyclic counting of master timing pulses during an interval established by the most significant digits of the count accumulated by measurement counter 12. This half-period is representative of a measured physical phenomenon; for example, in the instance of a linear accelerator this half-period is closely related to the transit time of a particle through a drift tube.

As has been mentioned, only the most significant digits of the count accumulated by measurement counter 12 are transferred to frequency counter 14. The least significant digit, or digits, of measurement counter 12 is transferred, via gate 22, to sum and carry circuit 24 and thence to storage register 26. The sum and carry circuit is a digital adder, and can be implemented by any standard technique applicable to the digital logic circuits being utilized. Gate 22 is enabled by the pulses produced by the recycling of frequency counter 14, allowing the least significant digit of measurement counter 12 to be fed to sum and carry circuit 24 at the end of every countdown cycle of frequency counter 14. The previously stored sum of storage register 26 is also fed to the input of sum and carry circuit 24, and accordingly the least significant digit of measurement counter 12 is added to the previously stored sum. When the sum of least significant digits exceeds a predetermined amount (i.e., one digit in the specific embodiment of FIGURE 1) a carry or overflow pulse is used to set the delay flip-flop 28, and any excess over such predetermined amount is entered into storage register 26. The delay flip-flop causes the frequency counter 14 effectively to accumulate one additional count of the timing pulses produced by fixed frequency oscillator 18, after the frequency counter reaches zero and before it is reset to the value held in measurement counter 12. The delay flip-flop is then reset. This process lengthens the half period of the output signal by one pulse time of the fixed frequency oscillator 18. As a result, the output square wave produced by flip-flop circuit 20 is corrected in frequency and phase whenever its error exceeds a tolerable level.

The following numerical example discussed in conjunction with Table 1 below, illustrates the operation of the circuit of FIGURE 1.

TABLE 1

| Frequency Counter Cycle | Storage Register Contents | Overflow and Correction |
|---|---|---|
| 1 | 3 | No |
| 2 | 6 | No |
| 3 | 9 | No |
| 4 | 2 | Yes |
| 5 | 5 | No |
| 6 | 8 | No |
| 7 | 1 | Yes |
| 8 | 4 | No |
| 9 | 7 | No |
| 10 | 0 | Yes |
| 11 | 3 | No |
| 12 | Etc. | |

Assume that the interval between start and stop pulses appearing on lines 15 and 17 is 10 times greater than the interval actually required for the desired frequency of the signal produced by flip-flop 20. In the particular example of the control of the accelerating voltage of a linear accelerator this may be achieved by making the spacing between the measurement grids 10 times the length of the first drift tube of the accelerator. Assume further that the count accumulated by measurement counter 12 at the completion of one measurement interval is 76923. This number then is 10 times the required count to be transferred to frequency counter 14 for the control of flip-flop 20 to produce a square wave having a half-period equal to the transit time thru a drift tube. Thus only the most significant digits (7692) are transferred to frequency counter 14, and the least significant digit (the number 3) is transferred to sum and carry circuit 24 and stored in register 26. On the second count-down cycle of the frequency counter 12 the least significant digit (3) is added to the digit previously stored in register 26, and a new sum (6) is stored. On the third cycle the sum stored in register 26 is 9. No overflow occurs up to this point in the operation. On the next cycle, however, the sum is 12, or greater than one digit. Sum and carry circuit 24 produces an overflow pulse, and enters the number 2 into register 24. This overflow pulse is applied to delay flip-flop 28. The resetting of the frequency counter 14 is thus delayed by one count, lengthening this half period of the output square wave by one timing pulse of the fixed frequency oscillator 18. The delay flip-flop is then reset. As this process continues, correction takes place for an average of 3 cycles out of 10 (in this example), with the result of permitting the error to build up and then re-referencing the output frequency and phase of the square wave out of flip-flop 20 on a periodic basis.

The counters, sum and carry circuit, connection register, delay logic, and other associated circuiting and gating may be implemented by standard digital techniques, such as those described in Logic Design of Digital Computers by Montgomery Phister, Jr., New York, Wiley, 1958.

The manner in which the above described frequency control system may be used in conjunction with a linear accelerator of the type wherein a particle is injected with an initial velocity into a series of drift tubes and subsequently accelerated by an alternating potential applied between adjacent drift tubes is illustrated in FIGURE 2. Details of one such linear accelerator are set forth in the afore-mentioned Patent No. 3,137,846.

Briefly, particle generator 30, which may be a Van de Graaff accelerator, injects charged microsized particles into the drift tubes designated by $32_1$–$32_n$. An accelerating potential is applied to the drift tubes such that there is polarity reversal for alternate periods of acceleration by connecting opposite terminals of an alternating high voltage source 36 to alternate adjacent drift tubes. The lengths of the drift tubes are successively greater such that with increasing velocity the time required for a particle to pass through each tube remains constant, thus allowing a constant frequency accelerating voltage to be used.

The required constant frequency is directly proportional to the initial velocity with which the particle is injected into the drift tubes. This velocity is detected by a pair of measurement grids (or similar detectors) 37 and 39 in front of the first drift tube. As a particle passes through measurement grids 37 and 39 voltage pulses are induced and fed, via amplifiers 41 and 43, to frequency control system 44. Frequency control system 44 is the system described in conjunction with FIGURE 1, and accordingly, amplifiers 41 and 43 supply the start and stop pulses, respectively, for measurement counter 12. The output of frequency control system 44, which is the square wave derived from flip-flop 20 (FIGURE 1) is applied to high voltage source 36, synchronously triggering high voltage source 36 such that an accelerating voltage of the desired frequency is applied to drift tubes $32_1$–$32_n$.

As has been mentioned, the spacing of measurement grids 37 and 39 in this specific embodiment is 10 times the length of the first drift tube. Since only the most significant digits of the count accumulated by measurement counter 12 is applied to frequency counter 14 to control the triggering of flip-flop 20, there is effectively a divide-by-ten action such that the square wave triggering high voltage supply 36 has a half-period approximately equal to the transit time through the first drift tube. This provides an accelerating voltage having the required phase reversal as the particle passes through successive drift tubes. The least significant digit of the count accumulated by measurement counter 12, then, is supplied to sum and carry circuit 24 and storage register 26 such that there is a periodic re-referencing of the frequency of the square wave triggering high voltage supply 36 in the manner previously discussed. As a result, the accuracy of the frequency of the accelerating voltage is enhanced with a corresponding increase in the number of times a particle receives an accelerating potential of the correct polarity during transit through the drift tubes.

The invention provides, therefore, a frequency control system capable of generating a signal having a frequency proportional to a measured physical phenomenon. It is particularly adaptable to be utilized in conjunction with a linear accelerator wherein an accelerating potential having a frequency accurately related to the velocity of the particle being accelerated is required. In this, and in other applications, periodic frequency and phase correction is achieved lengthening appropriate half cycles of the signal to be controlled, thus preventing the error from exceeding a tolerable level. High speed circuits are not required for accurate control, and the periodic corrections are readily generated by simple arithmetic techniques.

Although a specific embodiment of the invention has been described with particularity, it is not limited to the specific system and particular circuit arrangements herein disclosed, and modifications and variations thereof should be obvious to those skilled in the art. It is therefore to be understood that within the scope of the appended claims the invention may be practiced otherwise than specifically set forth.

What is claimed as new and desired to be secured by Letter Patent of the United States is:

1. Apparatus for generating an alternating signal wave having a frequency proportional to a measured physical phenomenon, including in combination:

means for providing a control signal representing a measurement interval substantially greater than the period of a half cycle of the alternating signal wave to be generated;

a fixed frequency oscillator for generating timing pulses at a rate substantially greater than the frequency of the signal to be generated;

first counter means coupled to said fixed frequency oscillator and responsive to said control signal for counting and cyclically registering the number of timing pulses occurring during the measurement interval represented by said control signal;

second counter means coupled to said fixed frequency oscillator and responsive to the most significant digits of the count registered by said first counter means to cyclically count said timing pulses during an interval established by said most significant digits;

bistable circuit means coupled to said second counter means and responsive to its cyclic counting operation to produce an alternating signal wave;

first circuit means responsive to said first and second counter means for producing a correction signal when the sum of the least significant digits of the count registered by said first counter means during the cyclic counting operation of said second counter means exceeds a predetermined amount; and second circuit means for applying said correction signal to said second counter circuit means for varying the period of a half cycle of said alternating signal wave a predetermined number of said timing pulses.

2. The apparatus of claim 1 wherein said means for providing a control signal includes particle velocity detection means of a linear accelerator, said linear accelerator being of the type wherein a charged particle is injected with an initial velocity into a series of drift tubes and subsequently accelerated by an alternating potential applied to said drift tubes, with said control signal representing the initial velocity of said charged particle, and with said alternating signal wave operable to control the frequency of said alternating potential.

3. Apparatus of claim 2 wherein said detection means includes first and second measurement grids spaced in front of the first of said series of drift tubes, with the spacing between said first and second measurement grids being substantially greater than the length of the first of said series of drift tubes.

4. Apparatus of claim 3 wherein the half cycle of said alternating signal wave is approximately equal to the transit time of said particle through said first drift tube.

5. Apparatus of claim 1 and wherein said first circuit means includes a sum and carry circuit coupled to receive the least significant digit of the count registered by said first circuit means, gating means for applying said least significant digit to said sum and carry circuit in response to the cyclic counting operation of said second counter means, and storage means for accumulating the sum of the least significant digits applied to said sum and carry circuit.

6. Apparatus of claim 5 and wherein said second circuit means includes delay circuit means for delaying the triggering of said bistable circuit means a predetermined number of said timing pulses when the accumulated sum of said least significant digits exceeds a predetermined amount.

References Cited
UNITED STATES PATENTS
3,296,525  1/1967  Sakuma _____ 307—88.5 X JAMES W. LAWRENCE, *Primary Examiner.*
S. A. SCHNEEBERGER, *Assistant Examiner.*